R. NYCE.
POULTRY WING HOLDER.
APPLICATION FILED MAR. 15, 1915.
1,164,388.
Patented Dec. 14, 1915.
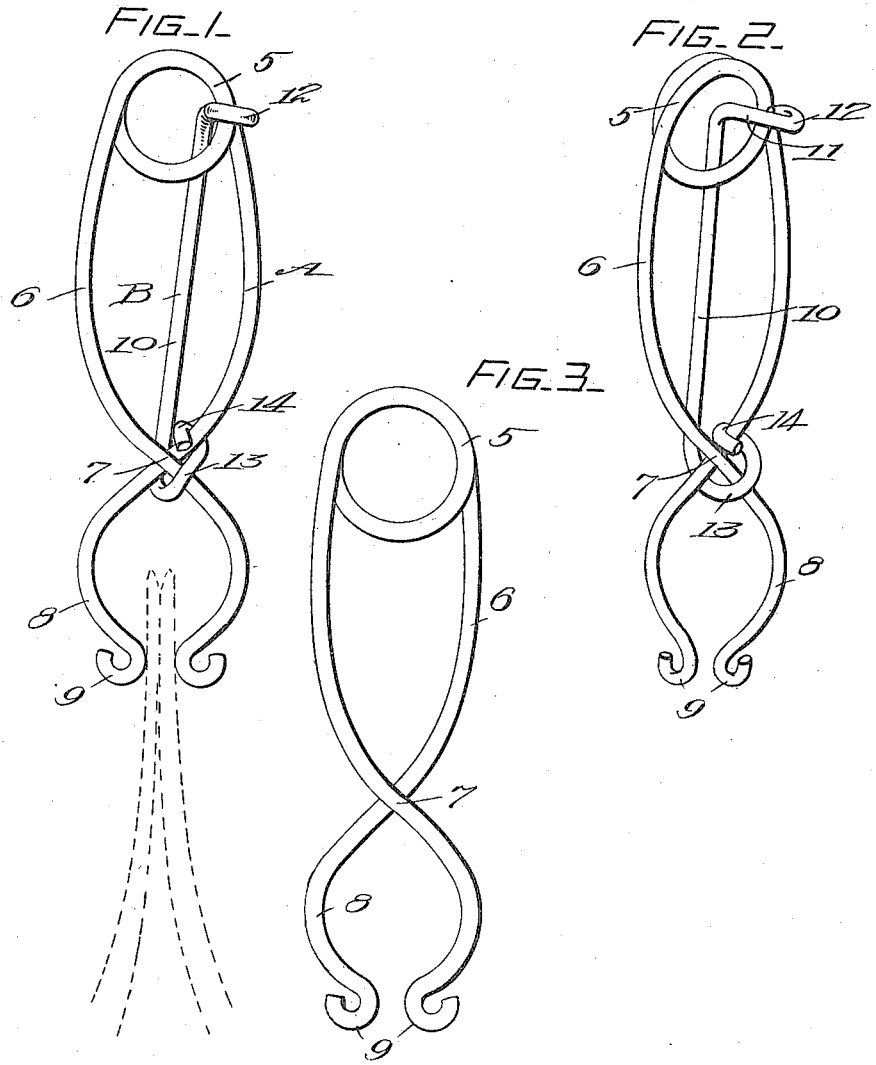
WITNESSES:
Jno. Y. Phillips
Alan T. Garner.
INVENTOR
REINARD NYCE,
BY Munn & Co.
ATTORNEYS.

UNITED STATES PATENT OFFICE.

REINARD NYCE, OF LANSDALE, PENNSYLVANIA.

POULTRY-WING HOLDER.

1,164,388.   Specification of Letters Patent.   Patented Dec. 14, 1915.

Application filed March 15, 1915.   Serial No. 14,305.

*To all whom it may concern:*

Be it known that I, REINARD NYCE, a citizen of the United States, and a resident of Lansdale, in the county of Montgomery and State of Pennsylvania, have invented a certain new and useful Improvement in Poultry-Wing Holders, of which the following is a specification.

This invention relates to an improvement in poultry wing holders.

One of the principal objects of the invention is to provide an improved device whereby the wings of a fowl may be held back and restrained in such position, so that the fowl may be suitably dusted with a germicide.

Another object of the invention is to provide a device of the type described in the nature of a spring clip which may be initially engaged upon the fowl's wings when they are folded back, and a locking device for locking the clip member in position.

Still another object is to provide a device of the class described which will be extremely simple, durable, efficient in operation, and cheap to manufacture.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a view in elevation of the device, illustrating the same in operation; Fig. 2 represents a view in perspective of the wing holder; Fig. 3 represents a view in elevation of the clip member of the device; Fig. 4 represents a view in perspective of the locking member thereof.

In carrying out my invention, I provide a clip member A and a locking member B. The spring clip member is preferably formed of a single strip of resilient wire doubled centrally and coiled into a spring at 5, the arms extending from this spring being then bowed outwardly as at 6 and being bent to cross each other as indicated generally at 7. The ends of arms 6 are then bent toward each other as at 8, and terminate in oppositely extending loops 9. The normal tendency of spring 5 and of the resiliency imparted to the arms from the nature of the material of which they are made, is to maintain the loops or engaging elements 9 in close relation to each other. The outwardly bent portions 6 form a grip for the hand of the operator whereby said outwardly bent portions may be pressed together against the tension of spring 5 in order to separate the engaging elements 9.

The locking member B consists of a shank 10 bent at right angles as at 11 at one end, said bent portion 11 terminating in a loop or catch 12 extending at right angles to shank 10. The opposite end of the shank is bent into a loop 13 lying at an acute angle to the shank, the loop terminating in a hook 14.

In securing the locking member B upon the clip member, hook 14 is engaged upon one of the arms adjacent the point at which said arms cross each other, as indicated in Fig. 2, in such manner that the loop 13 encompasses the bowed portion 8 of the opposite arm near this point where the arms cross. When the locking member is in position, the shank 10 extends generally in the direction of the spring 5, the catch 12 being disposed substantially in alinement with the axis of the spring portion 5. When the parts are in this position, the loop 13 and hook 14 loosely engage upon their respective arms, and the portion 11 carrying the catch 12 extends generally in the direction of the spring 5.

In operation the two wings of the fowl are pressed backwardly and held together by the left hand, and the clip is then grasped by the right hand with the locking member B lying over the back of the hand. Pressure is then exerted upon the arms of the device so as to separate the engaging elements 9 far enough that they may be slipped upon the opposite wings of the fowl. The portions 8 are then pressed together with the left hand until the engaging elements 9 grasp the wings at the desired tension, and while the device is thus held by the left hand, the right hand is utilized in pressing the shank toward the clip member, thus projecting the catch 12 through the spring 5. The parts being in this position, the shank is shifted to one side so as to engage the catch 12 beneath one of the convolutions of the spring in the manner indicated, thus tightening the hooks 14 and 13 against their respective arms whereby to bind the latter together and prevent movement of the arms and consequently the engaging elements 9 in either direction. The locking member B is made of resilient material, so that when it is in locked position, sufficient tension will be brought to bear against the arms for preventing their movement.

The device may be adjusted for holding the wings of different sized fowls, and in cases where the fowls are not particularly strong, the device may be used without the locking device.

Although I have described the preferred embodiment of my invention, I may desire to make such changes in the construction, combination, and arrangement of parts thereof, as do not depart from the spirit of the invention and the scope of the appended claims.

I claim:—

1. A wing holder comprising a strip of spring material looped together at its central portion to provide a spring, the ends of the material being then bowed outwardly, crossed, and then bowed inwardly, and finally formed into oppositely extending loops, and a locking member comprising a strip of resilient material bent at right angles at one end and at that end being formed into a catch extending at right angles to the main portion of the locking member adapted to be engaged with the spring, the opposite end of said locking member being formed into a loop extending at an acute angle to the main portion of the locking member, said loop terminating in a hook, adapted to be engaged with the ends at the crossed portions for binding them together.

2. In a device of the class described, a clip, said clip comprising a pair of crossed arms provided at one end with engaging elements normally maintained in close relation to each other, the opposite ends of the arms being connected with a spring, and a locking element provided with means at one end to engage the arms adjacent their crossed portions for binding the arms together in adjusted position, the opposite end of the locking member being provided with a catch adapted to engage said spring for maintaining the locking element in binding position.

3. A device of the class described, comprising a clip member including a pair of crossed resilient arms, a spring to which they are connected at one end, engaging elements carried by the opposite ends of the arms, and a locking member provided with means for engaging the arms adjacent their crossed portions whereby to bind them in adjusted position, and provided with means adapted to engage the clips for maintaining the locking element in binding position.

4. A device of the class described including a clip member comprising a pair of resilient arms provided with engaging elements, said arms being adapted to be adjusted for adjusting the engaging elements relatively to each other, and a locking member provided with means for frictionally binding the arms against each other to maintain them in adjusted position.

5. A device of the class described including a clip comprising arms adjustable relatively to each other for engaging a pair of wings, and a locking member having means for frictionally binding the arms together in adjusted position and having means to engage the clip whereby to retain the locking member in position.

REINARD NYCE.

Witnesses:
 ALBERT R. PLACE,
 BELLA HAWS.

Copies of this patent may be obtained for five cents each, by addressing the "Commissioner of Patents, Washington, D. C."